J. A. GREENE.
MODE OF ATTACHING RUBBER TIRES TO WHEELS.
No. 91,435. Patented June 15, 1869.
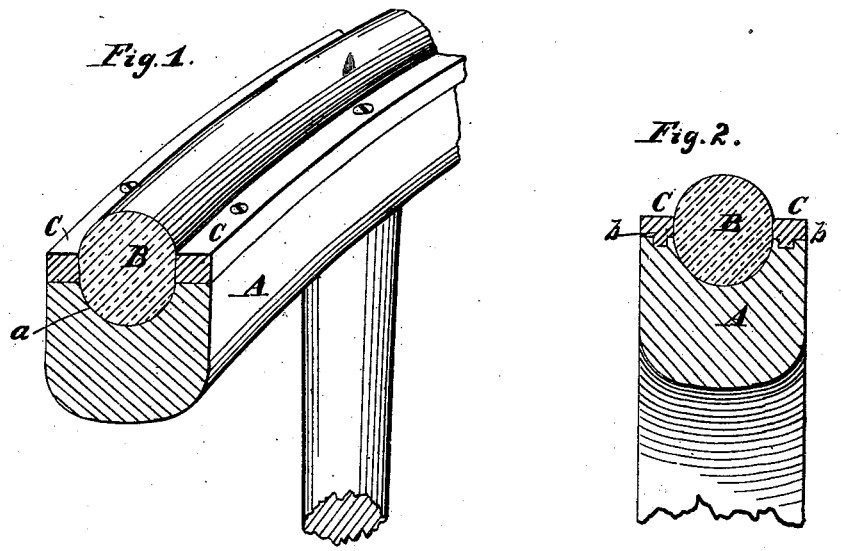
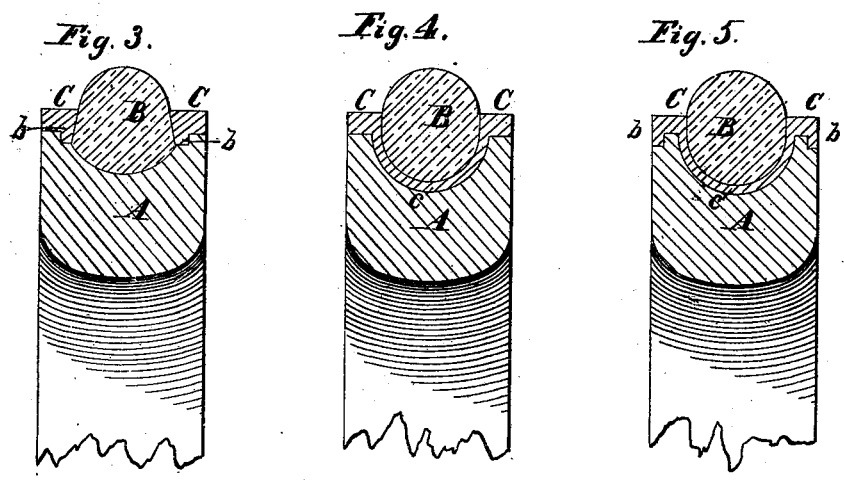
Witnesses
Inventor:
J. Ashton Greene
by his attorney

United States Patent Office.

J. ASHTON GREENE, OF BROOKLYN, NEW YORK.

Letters Patent No. 91,435, dated June 15, 1869.

IMPROVED MODE OF ATTACHING RUBBER TIRES TO WHEELS.

The Schedule referred to in these Letters Patent and making part of the same.

*To whom it may concern:*

Be it known that I, J. ASHTON GREENE, of Brooklyn, in the county of Kings, and State of New York, have invented certain new and useful Improvements in India-Rubber Tires for Carriage-Wheels and other Wheels, and in the mode of securing the same; and I hereby declare the following to be a full, clear, and exact description of the same, reference being had to the accompanying drawings, in which—

Figure 1 is a sectional perspective view of a portion of a wheel, provided with an India-rubber tire, in accordance with my invention.

Figures 2, 3, 4, and 5 are sectional views of modifications of the same.

My invention relates to that class of wheels, provided with rubber tires, in which the rubber tire is held in a groove in the rim of the wheel; and its object is to reduce, as much as possible, the weight of the wheel, and the expense attending its manufacture, as well as to employ a greater thickness of the rubber than has heretofore been practicable, without making the metal rim, which holds the rubber, and which is applied to the wooden felloe, too large and heavy. To this end, My invention consists in applying the rubber tire to the wooden felloe of the wheel, grooved in such manner as to partly enclose the rubber, whether the periphery of the felloe be protected by two metal tires, one on each side of the groove, or by a tire conforming to the periphery of the felloe, i. e., covering both the sides and groove.

By thus forming, in the wooden felloe, the groove for receiving the rubber, a tire of the latter material, cylindrical in section, and of considerable thickness and, consequently, elasticity, can be employed, without materially increasing the size of the wheel.

The rubber, which is stretched tightly around in the groove formed in the wooden felloe, serves to support and strengthen the latter, which is also further strengthened and protected by the auxiliary metal tire which encircles it.

The metal tire need be of but little breadth and thickness, so that the weight of the wheel is considerably reduced, without detracting from its strength.

The manner in which my invention is or may be carried into effect will be readily understood, by reference to the accompanying drawings, in the various figures of which—

A represents the wooden felloe,

B, the rubber tire, and

C, the metal bands, or auxiliary ties, on each side of the rubber.

In the felloe A, a groove, *a*, is cut, of a depth proportionate to the thickness of the rubber tire, leaving a sufficient portion of the periphery of the felloe on each side to receive the metal band C.

The form of the groove will be governed by the form of the rubber tire, which I prefer to make cylindrical, as being more readily manufactured and better adapted for general use, though it may have any other suitable shape given it.

The rubber is stretched tightly around the felloe, and in the groove, and the metal bands are applied so as to slightly pinch or press laterally against the rubber tire, which projects from between them.

The bands C can be shaped and applied to the wheel in various ways.

In fig. 1 they are flat strips, which are applied and screwed or nailed to the rim in the usual manner.

In fig. 2 each is provided on the under side with a central flange, *b*, which fits in a corresponding groove formed in the periphery of the rim, and thus serves to assure the band accurately in position.

In fig. 3 the position of these flanges *b* is changed to the inner sides, or those sides contiguous to the rubber, and they are made to slant or converge slightly, so as to pinch the rubber tightly.

In fig. 4 the metal auxiliary tire is formed in one piece, with a metal lining, *c*, for the groove *b*, so as to conform to and cover the whole of the periphery of the felloe.

In fig. 4 the flanges are shifted to the exterior edges of the metal tire, the latter being made, as in the preceding figure, with the metal lining *c*.

These auxiliary tires, of the various forms shown, can be readily rolled or otherwise manufactured, and their weight is much less than that of ordinary metal tires, or of metal rims usually employed with rubber tires.

It is also manifest, that by setting the rubber into the wooden felloe, a tire of much greater thickness and elasticity can be employed than has heretofore been practicable, without making the wheel too large, while the combined effect of the metal band and rubber tire is to maintain perfectly the strength of the wheel, which is thus adapted to be used for all purposes for which ordinary wheels are used, as, for instance, with carriages, velocipedes, &c.

Having now described my invention, and the manner in which the same is or may be carried into effect,

What I claim, and desire to secure by Letters Patent, is—

The employment, in combination with the grooved felloe and rubber tire, of a metallic auxiliary tire or tires, covering the periphery of the felloe, on each side of the groove, and pinching or compressing laterally the rubber, substantially as and for the purposes shown and set forth.

In testimony whereof, I have signed my name to this specification, before two subscribing witnesses.

J. ASHTON GREENE.

Witnesses:
 HENRY A. TWEED,
 JOHN W. McCAY.